United States Patent [19]

Laakmann et al.

[11] Patent Number: 4,805,987
[45] Date of Patent: Feb. 21, 1989

[54] HOLLOW LIGHTPIPE USING A LOW REFRACTIVE INDEX INNER LAYER

[76] Inventors: Katherine D. Laakmann; Peter Laakmann, both of The Highlands, Seattle, Wash. 98177

[21] Appl. No.: 139,285

[22] Filed: Dec. 29, 1987

[51] Int. Cl.⁴ .............................................. G02B 6/20
[52] U.S. Cl. ................. 350/96.32; 350/96.34
[58] Field of Search ................ 350/96.30, 96.32, 96.34

[56] References Cited
FOREIGN PATENT DOCUMENTS
2352670  4/1975  Fed. Rep. of Germany ... 350/96.32

Primary Examiner—William L. Sikes
Assistant Examiner—Robert E. Wise
Attorney, Agent, or Firm—Seed and Berry

[57] ABSTRACT

A hollow lightpipe for conducting high power levels of $CO_2$ laser light with low transmission losses. A highly reflective layer is formed on the inner surface of an elongated bendable metal housing. The material forming the highly reflective layer is chosen to have a complex index of refraction whose real part (n) is less than about 0.4. The thickness of the reflective layer need not be highly controlled, but must be sufficiently thick that it exhibits bulk absorption properties without being so thick that it cracks when the lightpipe is flexed. In a second embodiment, the transmission properties of the highly reflective layer can be enhanced by coating the reflective layer with a thin film of a dielectric materials such as $ThF_4$ and Ge.

13 Claims, 1 Drawing Sheet

HOLLOW LIGHTPIPE USING A LOW REFRACTIVE INDEX INNER LAYER

TECHNICAL FIELD

This invention relates to lightpipes, and more particularly, to hollow lightpipes having highly reflective inner surfaces.

BACKGROUND ART

For some time now, researchers have been attempting to develop an optical fiber or lightpipe for $CO_2$ laser wavelengths (i.e., 10.6 micrometers). The lightpipe should be flexible, have a transmittivity greater than 90 percent per meter, and be capable of transmitting power levels in excess of fifty watts. This flexible lightpipe, which can exceed one meter in length and have an inner diameter of about one millimeter, should also be easily manufactured, inexpensive, and non-toxic. Lightpipes having such properties are suitable for numerous military, scientific, medical, and industrial applications.

A variety of approaches to this development problem have been taken, some meeting with limited success. There are several existing solid-type lightpipes relying on total internal reflection, but none of these has yet reached commercial realization. The hollow waveguide described by Katherine D. Laakmann in U.S. Pat. No. 4,652,083 is available commercially, but suffers from limited flexibility and length. It is also difficult to manufacture because of the difficulty in depositing one or more thin film layers of precise thickness onto the interior wall of a long, narrow lightpipe.

It is therefore desirable to have a material whose refractive index is such that it will produce high light reflectivity from the internal surfaces of a hollow lightpipe of all polarizations of light over grazing angles of light incidence.

DISCLOSURE OF THE INVENTION

It is an object of the present invention to provide a material that is highly reflective to all polarizations of light where the range of incidence angles is between about eighty and ninety degrees.

It is another object of the present invention to provide a lightpipe that is highly transmissive to all polarizations of light at $CO_2$ laser wavelengths.

It is yet another object of the present invention to provide a lightpipe that is capable of transmitting high power levels.

Still another object of the present invention is to provide a bendable light pipe that is transmissive to light at $CO_2$ laser wavelengths.

According to one aspect, the present invention provides a waveguide for high efficiency transmission of laser light. The waveguide comprises an elongated housing having an interior surface defining an elongated interior space through which the laser light is transmitted and a reflective layer formed on the interior surface of the housing for reflecting the laser light incident thereon, the layer being composed of a material having a complex index of refractivity with a real part (n) less than about 0.4.

In another aspect, the invention provides a bendable waveguide for high efficiency transmission of laser light. The waveguide comprises an elongated bendable metal housing having an interior surface defining an elongated interior space through which the laser light is transmitted and a reflective layer of silicon carbide (SiC) formed on the interior surface of the housing, the layer having a thickness greater than about three micrometers.

BEST MODES FOR CARRYING OUT THE INVENTION

Figure 1:
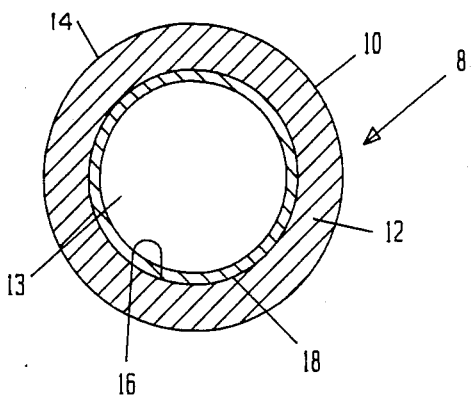
FIG. 1 is an enlarged axial cross-sectional view of a first embodiment of the lightpipe of the present invention.

The possibility of a hollow lightpipe using low refractive index materials for reflective surfaces has been noted by researchers in the past, but their understanding of the mechanism and, therefore, the requirements for the low index material was erroneous.

For example, in the Journal of Applied Physics, vol. 53, No. 8 (1982), Hidaka et al attempted to use a germanium dioxide ($GeO_2$) glass for the interior walls of a hollow lightpipe. U.S. Pat. No. 4,453,803, to Hidaka et al, is based on this work. In the publication, a transmission of approximately 97.7 percent per meter (or a loss of 0.1 dB per meter) for a one millimeter internal diameter hollow lightpipe was predicted. Actual measurements, however, yielded a transmission of less than 25 percent per meter for a 0.6 millimeter bore. Even accounting for the difference in bore size between the theory and measurements, it is difficult to explain this discrepancy on the basis of measurement tolerances.

The predicted loss has been recomputed, based on the complex refractive index of the $GeO_2$ glass. The complex refractive index, as measured by Hidaka et al, was 0.6 - i 0.1. The reflectivity at an 85 degree incidence angle is calculated to be approximately 95 percent, while at 88 degrees, it is 98 percent. The transmission was predicted to be approximately 31 percent, with the assumption of a modest radius of curvature of 100 centimeters. Unless particular effort is taken to keep a lightpipe straight, most hollow lightpipes will act as if they have a curvature of this magnitude. In addition, a transmission of less than ten percent per meter was predicted for a $GeO_2$ glass lightpipe with a radius of curvature of ten centimeters. Therefore, the hollow lightpipe as proposed by Hidaka et al is totally unsuitable because of poor transmission. Indeed, only if the inner surface of the lightpipe has a considerably lower index can it provide adequate transmission.

In the Journal of Applied Physics, Vol. 52, p. 4467 (1981), Hidaka et al have also predicted the performance of a lightpipe using $PbO-SiO_2$ glass. We have predicted the poor results they reported in that publication, based on the refractive index of the material.

Other publications dealing with hollow glass lightpipes and alumina waveguides are "Experimental evaluation of a hollow glass fiber," Applied Optics, Vol. 25, No. 3, Feb. 1, 1986, by A. Bornstein and N. Croitoru and "Dispersion Phenomena in Hollow Alumina Waveguides," IEEE Journal of Quantum Electronics, Vol. QE-21, No. 10, October 1985, by R. Jenkins and R. Devereux.

It seems more appropriate to define the problem as follows: What is the refractive index necessary to ensure that a beam suffers minimum reflection loss as it travels down a hollow lightpipe of finite curvature? Defined in this way, the problem becomes one of maximizing the reflectivity for the average of all polarizations for angles of incidence exceeding 80 degrees. The solution is a low index material as discussed below.

Only materials with a very low complex refractive index will be highly reflective at lightpipe grazing angles and $CO_2$ laser wavelengths. These materials can be defined as having a refractive index whose real part (n) is less than about 0.4. More specifically, if n is between about 0.4 and 0.15, the imaginary part (k) of the index of refraction should be less than about 1.5 and, if n is less than about 0.15, k should be either less than about 0.5 or greater than about 2.0. As can be seen from Table A, smaller values of n allow larger values of k for the same reflectivity.

TABLE A

| | Reflection Loss at 81 Degrees | | |
|---|---|---|---|
| n | k | Loss, S | Loss, P |
| 0.05 | −0.1 | 0.63 | 0.31 |
| 0.05 | −0.5 | 2.51 | 1.13 |
| 0.05 | −1.0 | 3.23 | 1.11 |
| 0.10 | −0.1 | 1.26 | 0.63 |
| 0.10 | −0.5 | 4.97 | 2.25 |
| 0.10 | −1.0 | 6.37 | 2.20 |
| 0.20 | −0.01 | 0.26 | 0.13 |
| 0.20 | −0.05 | 1.31 | 0.67 |
| 0.20 | −0.1 | 2.58 | 1.32 |
| 0.20 | −0.2 | 4.93 | 2.49 |
| 0.40 | −0.05 | 2.98 | 1.63 |

Referring to FIG. 1, a first, bendable, embodiment of a lightpipe 8 of the present invention can be seen to comprise an elongated tubular housing 10 with a circumferential sidewall 12 made from a flexible material defining an elongated hollow central opening 13. The sidewall 12 has an outer surface 14 and an inner surface 16. Preferably the flexible material is a metal, which can be chosen from the group comprising beryllium copper (BeCu), aluminum (Al), and stainless steels, although other flexible materials are also suitable. In one preferred embodiment of the invention, the inner surface 16 of the housing 10 is circular in cross-section. However, for specific applications, the cross-section of the inner surface 16 can be non-circular. The wall thickness of the sidewall 12 between the outer surface 14 and the inner surface 16 is chosen to provide adequate mechanical integrity and flexibility. The wall thickness is dependent upon both the material from which the sidewall 12 is made and the expected application of the lightpipe. The outer cross-sectional dimension of the housing 10 is typically in the range of 0.3 millimeters to 3.0 millimeters.

While, in some applications, it is desirable that the lightpipe be bendable, other applications may require that the lightpipe be rigid. A rigid lightpipe can be made according to the description above if the housing 10 is composed of an inflexible material. An example of such a lightpipe is one in which the housing 10 is made from a hollow rod of silicon carbide (SiC), the interior surface of the SiC rod serving as a highly reflective layer 18, as discussed below.

In general, the highly reflective layer 18 of material is formed on the housing inner surface 16. Laser light that has been introduced into the housing central opening 13 reflects from the reflective layer 18 on the inner surface 16 at angles of incidence in the range of eighty to ninety degrees, as measured from a normal to the inner surface 16 (i.e., the grazing angle). The transmission efficiency of the light through the lightpipe is dependent upon the index of refraction of the material that composes the highly reflective layer 18. The index of refraction is a complex number whose real and imaginary components are dependent upon the wavelength and polarization of the incident light. The light polarization is determined by whether the electric field (E-field) vector is parallel to the light's plane of incidence (S-polarized) or perpendicular to the light's plane of incidence (P-polarized).

It has been determined that the highly reflective layer 18 is preferably made from a material having a low index of refractivity. The material in the highly reflective layer 18 should also be chosen for its flexibility, safety, and ease of manufacturing.

In one embodiment, the reflective layer 18 of the elongated housing 10 can be made from a layer of silicon carbide (SiC). SiC has an index of refractivity with $n=0.06$ and $k=1.12$ at an approximate wavelength of 10.6 micrometers. The computed reflectivity is greater than 98.9 percent for incident angles greater than 85 degrees for P and S polarizations averaged.

With perfectly smooth walls (i.e., no scattering due to wall roughness), the computed transmission, for a curved hollow lightpipe having the inner surface 16 with a 0.5 millimeter inner diameter and having a twenty centimeter radius of curvature, is greater than 90 percent per meter. The thickness of the SiC layer need only be sufficiently thick to provide bulk absorption properties without inhibiting flexibility. It has been found that a thickness of at least about three micrometers is more than adequate.

By comparison, as disclosed in the above-referenced prior art Laakmann patent, the complex index of refractivity used therein has an n that is greater than 1.0, a k that is vanishingly small (i.e., less than $10^{-3}$). Also, the thickness of the coating is a very precise fraction of the wavelength of light to be used (i.e., one-eighth of the wavelength). Because of the close tolerances required in the prior art Laakmann patent, lightpipes made according to the method disclosed therein will be more expensive than those made according to the present invention.

In general, the highly reflective layer 18 of the present invention should have a complex index of refraction with a real part that is relatively small and a thickness that is unimportant as long as it is thick enough to assure that the reflective layer 18 has bulk absorption properties.

Figure 2:
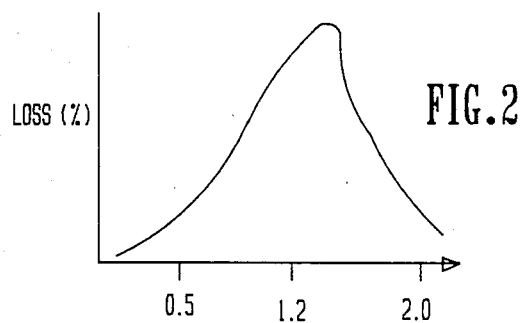
FIG. 2 is a graph of lightpipe transmission loss as a function of the imaginary component of the complex index of refraction, for the lightpipe of FIG. 1.

It has been found that, for values of n which are sufficiently low, acceptably low losses are obtained when the imaginary part of the index of refraction has a value outside of a specific range. As shown in the graph of FIG. 2, for values of k of less than approximately 0.2 and for a fixed angle of incidence, transmission loss is maximum when the imaginary component has a value of approximately 1.2. In order to keep the transmission loss acceptably low, therefore, it is desirable to maintain k with a value that is less than approximately 0.5 or greater than approximately 2.0.

Figure 3:
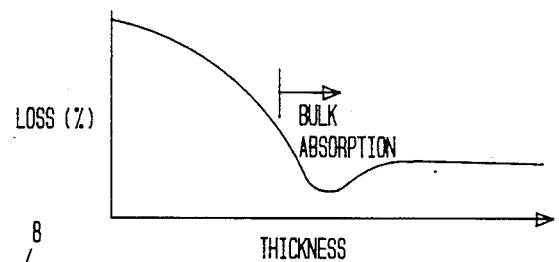
FIG. 3 is a graph of lightpipe transmission loss as a function of thickness of the layer of reflective material formed on the inner surface of the lightpipe, for the lightpipe of FIG. 1.

The graph in FIG. 3 show the effect of the thickness of the reflective layer 18 on transmission loss for a fixed angle of incidence and a fixed laser light wavelength, when the reflective layer 18 is made from SiC. It can be seen that as the thickness of the reflective layer 18 increases to the point where the material begins to exhibit bulk absorption properties, the transmission loss decreases to a minimum value, beyond which it increases only slightly to a constant value. Therefore, transmission loss can be held at nearly its minimum value by assuring that the thickness of the reflective layer 18 exceeds that required to give bulk absorption properties. A usable upper limit on the thickness of the reflective layer 18 is that thickness at which the layer cracks when the lightpipe is bent to its minimum expected radius of curvature.

In addition to making a hollow lightpipe whose highly reflective layer 18 has the proper reflectivity properties, it is important that the lightpipe be easily manufactured. The lightpipe shown in FIG. 1 can be made in several ways. In a first method, the reflective layer 18 can be formed initially over a mandrel and metal elongated housing 10 subsequently formed over the reflective layer 10 by sputtering or chemical vapor deposition (CVD), among other techniques. The mandrel should have an outer diameter approximately equal to the desired inner diameter of the waveguide to be produced.

The housing 10 can be sputtered on the reflective layer 18 by creating ionized particles of the material from which the housing 10 is made and causing the reflective layer 18 to have an electrical potential which attracts the ionized particles. Sputtering produces the housing 10 with a substantially uniform thickness.

In CVD, the mandrel covered by the reflective layer 18 is placed in an enclosure containing a vaporized atmosphere of the reflective material desired for the housing 10. All surfaces of the reflective layer 18 will be coated with the desired material for housing 10 in a substantially uniform layer. In this method, the mandrel, which may be made from silicon, molybdenum, tungsten, or graphite, for example, can then be dissolved, leaving the waveguide consisting of the reflective layer 18 on the inner surface of the housing 10. This method may be particularly suitable for forming the rigid embodiment of the lightpipe of the present invention, especially one composed of a single material.

In a second method, the reflective layer 18 can be formed on the inner surface 16 of the housing 10 by either sputtering or CVD techniques, as described above.

In a third method, the lightpipe can be formed by placing the highly reflective layer 18 on a flat sheet (not shown) of the material which will be formed into the tubular housing 10. After a reflective layer 18 of adequate thickness has been formed, the sheet of the housing material is rolled into a small dimension tube so that the reflective layer 18 is interior of the inner surface 16 of the housing 10. A difficulty with this method is that the reflective layer 18 will have to have a relatively high tolerance to bending so that it will not crack when the housing 10 is rolled to form the tube.

Figure 4:
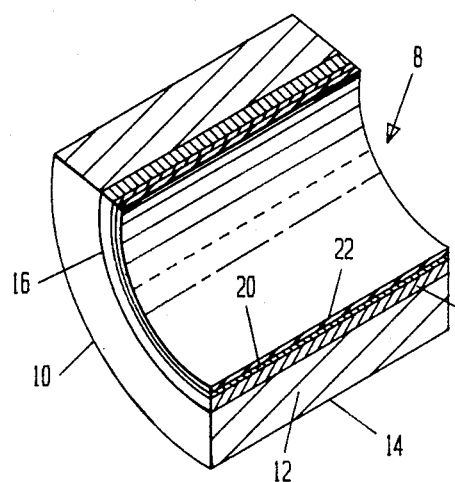
FIG. 4 is a closeup cutaway view of a portion of the wall of a second embodiment of the lightpipe of the present invention.

An extension of this concept is to enhance the reflectivity of the low index reflective inner surface 16 by dielectrically overcoating it. Referring to the closeup cutaway view of FIG. 4, for example, a first overcoat 20 of 1.51 micrometers of ThF$_4$ is applied and then a second overcoat 22 of 0.9 micrometers of Ge is applied to enhance the reflectivity of the inner surface 16. However, a drawback of enhancement coatings is the requirement to use precision thin film deposition. This approach would be desirable if sufficiently low refractive materials could not be obtained, but low loss (i.e., low k value) dielectric coatings were available.

While the invention has been discussed in terms of specific embodiments, one skilled in the art will readily appreciate that various modifications of the above-described embodiments may be made without departing from the spirit and the scope of the invention. Accordingly, the present invention is to be limited only by the following claims.

We claim:

1. A waveguide for high efficiency transmission of laser light, comprising:
   an elongated housing having an interior surface defining an elongated interior space through which the laser light is transmitted; and
   a reflective layer formed on the interior surface of the housing for reflecting the laser light incident thereon, the layer being composed of a material having a complex index of refractivity with a real part (n) less than about 0.4.

2. The waveguide of claim 1 wherein the elongated housing and the reflective layer are composed of the same material.

3. The waveguide of claim 1 wherein the reflective layer is composed of silicon carbide (SiC).

4. The waveguide of claim 1 further including a low-loss thin film dielectric coating formed over the reflective layer on the interior surface thereof.

5. A waveguide for high efficiency transmission of laser light, comprising:
   an elongated housing having an interior surface defining an elongated interior space through which the laser light is transmitted; and
   a reflective layer formed on the interior surface of the housing for reflecting the laser light incident thereon, the layer being composed of a material having a complex index of refractivity with a real part (n) less than about 0.4 and an imaginary part that is less than about 0.5 or greater than about 2.0.

6. The hollow waveguide of claim 5 further including a low-loss thin film dielectric coating formed over the reflective layer on the interior surface thereof.

7. A bendable waveguide for high efficiency transmission of laser light, comprising:
   an elongated bendable metal housing having an interior surface defining an elongated interior space through which the laser light is transmitted; and
   a reflective layer of silicon carbide (SiC) formed on the interior surface of the housing, the layer having a thickness greater than about three micrometers.

8. The waveguide of claim 7 wherein the housing is composed of a metal in the group comprising beryllium copper, aluminum, and stainless steel.

9. The waveguide of claim 7 wherein the cross section of the internal surface is substantially circular.

10. The waveguide of claim 7 further including a low-loss thin film dielectric coating formed over the reflective layer on the interior surface thereof.

11. A bendable waveguide for high efficiency transmission of laser light by internal reflection, the waveguide comprising:
    a bendable elongated housing made from a metal in the group comprising beryllium copper, aluminum, and stainless steel, the housing having outer dimensions between about 0.3 millimeters and about 3 millimeters and an interior surface having a substantially circular cross section; and a reflective layer of silicon carbide (SiC) formed on the interior surface of the housing, the layer having a thickness greater than about three micrometers.

12. A bendable waveguide for high efficiency transmission of laser light by internal reflection, the waveguide comprising:

a bendable metal housing having outer dimensions between about 0.3 millimeters and about 3 millimeters and an interior surface having a substantially circular cross section; and a reflective layer formed on the interior surface of the housing, the layer being made from a material having a complex index of refractivity whose real part (n) is less than about 0.15.

13. The hollow waveguide of claim 12 wherein the imaginary part (k) of the complex index of refractivity is less than about 0.5 or greater than about 2.0.

* * * * *